Aug. 15, 1967    R. M. WILLIAMS    3,335,967
SCRAP METAL REDUCTION APPARATUS
Filed Oct. 2, 1964    6 Sheets-Sheet 1

INVENTOR:
ROBERT M. WILLIAMS
BY Gravely, Lieder & Woodruff
ATTORNEYS

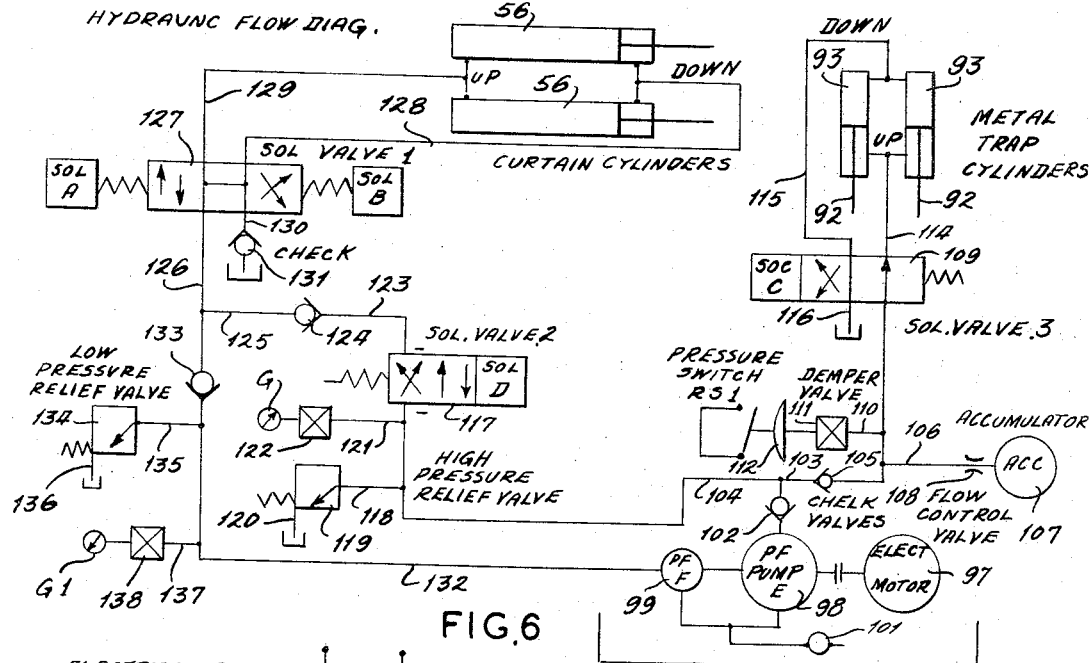
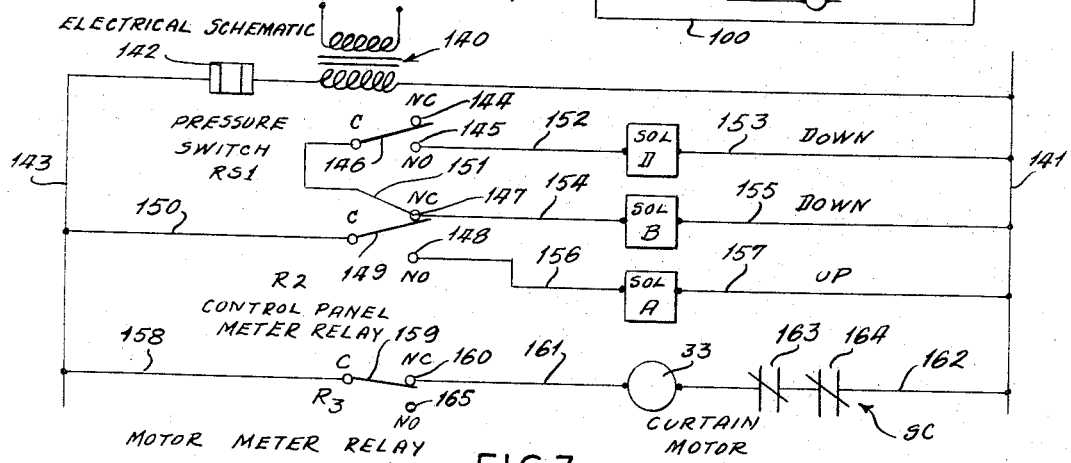
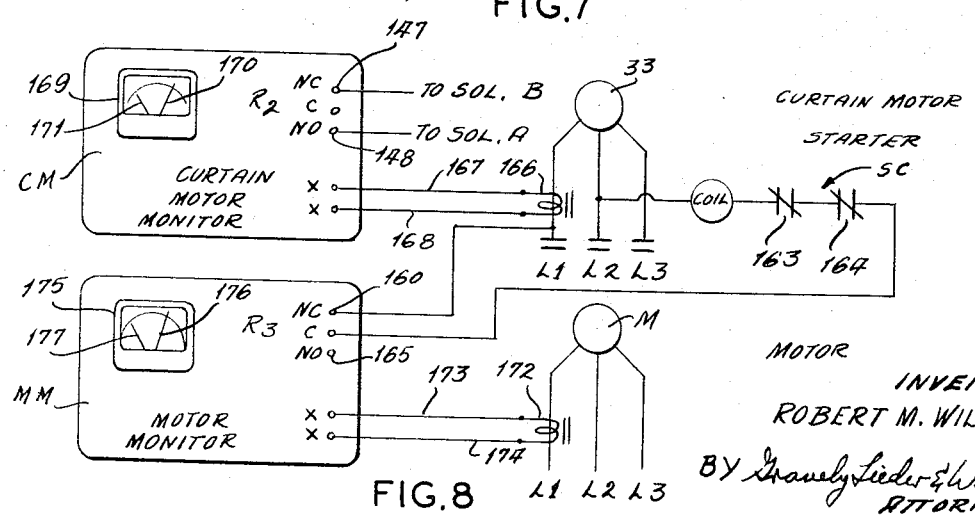

United States Patent Office 3,335,967
Patented Aug. 15, 1967

3,335,967
SCRAP METAL REDUCTION APPARATUS
Robert M. Williams, Ladue, Mo., assignor to Williams Patent Crusher & Pulverizer Co., Inc., St. Louis, Mo., a corporation of Missouri
Filed Oct. 2, 1964, Ser. No. 400,991
11 Claims. (Cl. 241—35)

ABSTRACT OF THE DISCLOSURE

Apparatus for reducing larger scrap metal bodies to small sizes suitable for bulk handling including feeding the bodies into a chute which directs the same into a reducing mill of rotary hammer type, and controlling the feeding by crusher means in the feeding chute, which crusher means may consist of a curtain of crusher bars movable about a hanging frame or crusher bars movable about at least the lower end of the frame. Separate power means is provided to drive the bars and cause the frame to swing about the axis of the hanging frame, wherein the power transmittal is from the outside of the apparatus to the interior through a shaft and concentrically related tubular shaft means having bearing means between it and the shaft.

---

This invention relates to improved apparatus for reducing scrap metal from large size, such as discarded auto bodies, to small size which can be refined for reuse in steel mills.

A large and economically valuable source of scrap metal that is required by refining mills is in discarded auto bodies. The metal portions of these bodies is high quality and is desirable. In reducing auto bodies, a problem is to eliminate contaminating materials so that the metal scrap is upgraded for use in making steel. Another problem is that the auto bodies are usually so large they must be cut up or crushed before being fed into the reducing apparatus.

A general object of this invention is to provide apparatus that can handle the entire auto body without requiring it to be crushed or cut up beforehand.

A particular object of the invention is to provide scrap metal reduction apparatus with means to receive an auto body and control the feed of the body into reduction means whereby the rate of feed can be made to suit the ability of the reducing means to handle the body without overfeeding or underfeeding.

Another object of the invention is to provide a reduction mill with improved feed control means and a system associated therewith to sense the action of the mill and regulate the feed control means for efficient results.

Another object of the invention is to provide the inlet to a scrap metal reduction mill with a controllable inlet curtain which is operable to handle entire auto bodies and control the rate of feed thereof, so as to avoid overloading the mill.

Yet another object of the invention is to provide a control system for apparatus of the foregoing character, whereby the operation of the apparatus may be monitored to suit the variations encountered in handling many different types of auto bodies.

Other objects of the invention and the advantages to be derived therefrom will be set forth as the description of a presently preferred embodiment proceeds in view of the accompanying drawings, wherein:

FIG. 6 is a diagrammatic view of the hydraulic system for controlling the apparatus;

FIG. 7 is a wiring diagram for certain relays in the apparatus; and

FIG. 8 is a diagram of the motor monitoring circuit.

Figure 1:
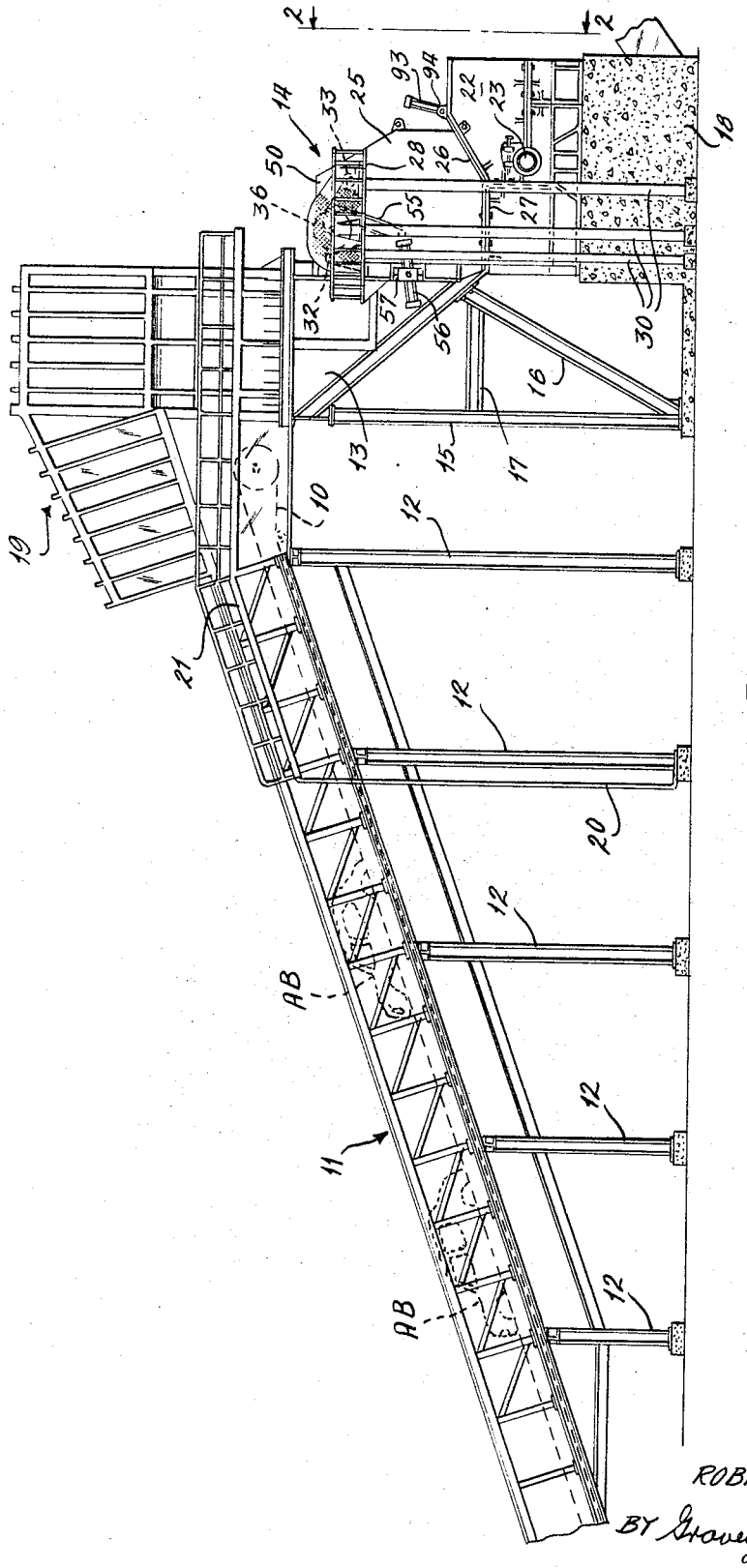
FIG. 1 is a side elevational view of the major components of the apparatus of this invention.

In FIG. 1, the apparatus includes a conveyor 10 carried in structure 11 set on suitable columns 12 of progressive height to support the conveyor at an incline whereby the auto bodies AB are elevated to the top of a hopper 13 for the reducing mill 14. The hopper 13 is supported by columns 15 and braces 16 and 17, as well as by the base 18 that carries the mill 14. The hopper 13 and adjacent end of conveyor 10 are covered by a suitable canopy 19 to guard against flying metal and dust. The conveyor 10 and hopper 13 can be reached for inspection and for other reasons by a ladder 20 leading to a catwalk 21 on the structure 11.

Figure 2:
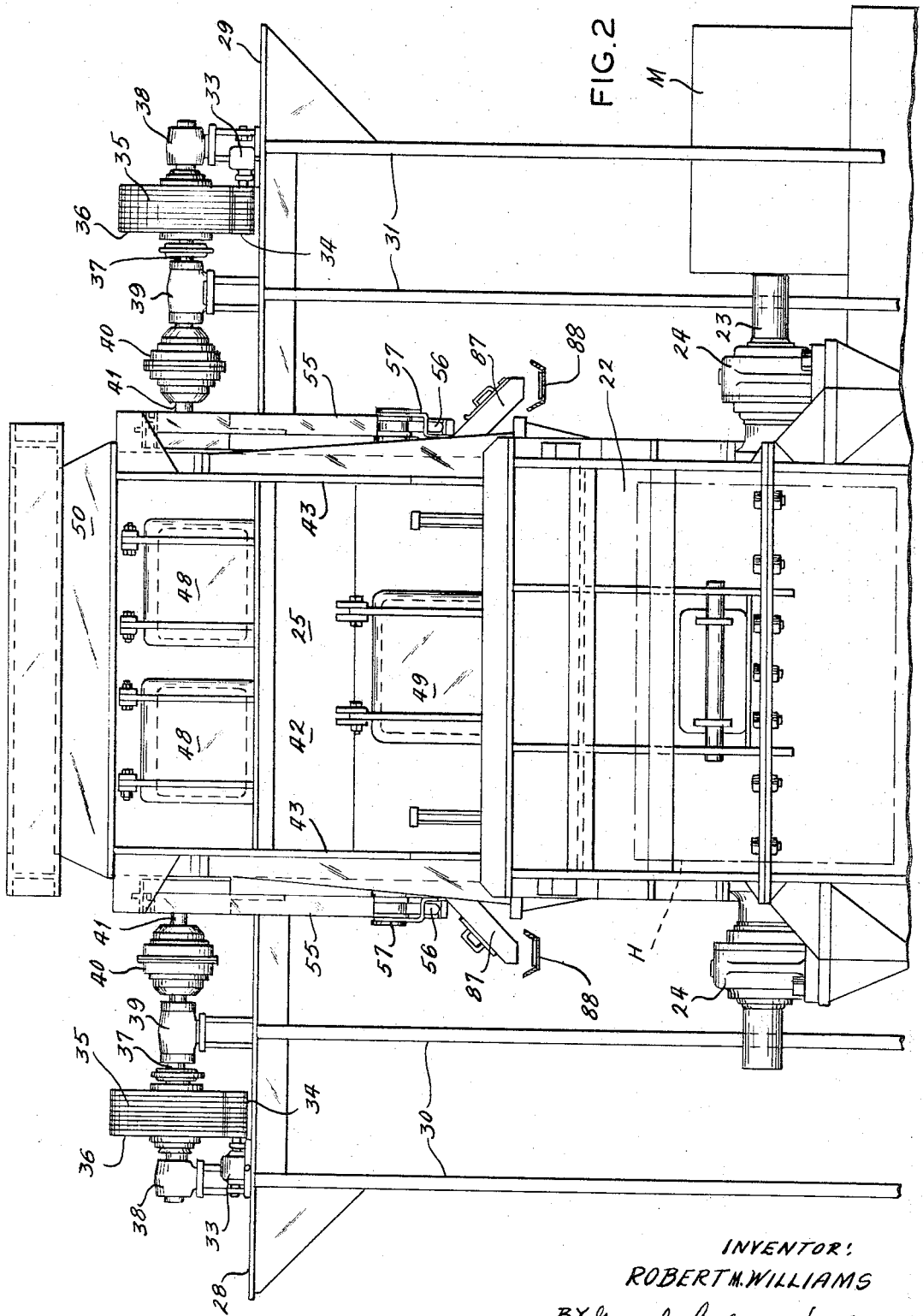
FIG. 2 is a greatly enlarged end elevational view of the apparatus, the view being seen at line 2—2 in FIG. 1.

In FIGS. 1 and 2, the reducing mill carried on base 18 comprises a casing structure 22 of heavy plates bolted or otherwise connected to form an enclosure for a hammer rotor H, in FIG. 2, carried on a shaft 23 supported by bearings 24. A main mill motor M is connected to one end of shaft 23. The casing 22 carries an upper housing 25 attached to it along flanges 26 and 27, and the feed in hopper 13 is connected to the housing 25. Near the upper end of housing 25 there are provided two side platforms 28 and 29, each supported by columns 30 and 31 respectively. The platform 28 carries a reaction arm device 32, a drive motor 33 rotating a V-belt pulley 34 which is connected by a plurality of V-belts 35 to a gear assembly housed in pulley 36 on shaft 37, supported in bearings 38 and 39. Shaft 37 is connected to a coupling 40 which drives shaft 41 of the apparatus in housing 25. The platform 29 on the opposite side supports an assembly of parts like those on platform 28, and the same reference numerals will be used to designate similar parts which may vary in being a left or a right part. The torque reaction device 32 (FIG. 1) is coupled directly to the reaction sleeve of the gear assembly in pulley 36 by means of leaf springs so that the sleeve does not rotate, this activating the gear assembly to rotate pulley 36. Should uncrushable material enter the apparatus 14 so as to tend to jam the action of the curtain the springs of the reaction device 32 will break and prevent damage.

The housing 25 is comprised of several (FIGS. 2 and 3) wall panels suitably secured together to form a back wall 42, opposite side walls 43, and an upper front wall 44 with flanges 45 providing means for connecting the hopper 13. Hopper 13 has a sloping bottom wall 46 carried on structural members 47 which are worked into the support members 15 and 16. In the back wall 42 of housing 25 provision is made for mounting explosion safety doors 48, and an access door 49 leading to the interior of the mill 14 where the hammer rotor, breaker plates, and feed control curtain components are cooperatively mounted, as will be described. A cover 50 completes the enclosure of the operating mechanism.

Figure 3:
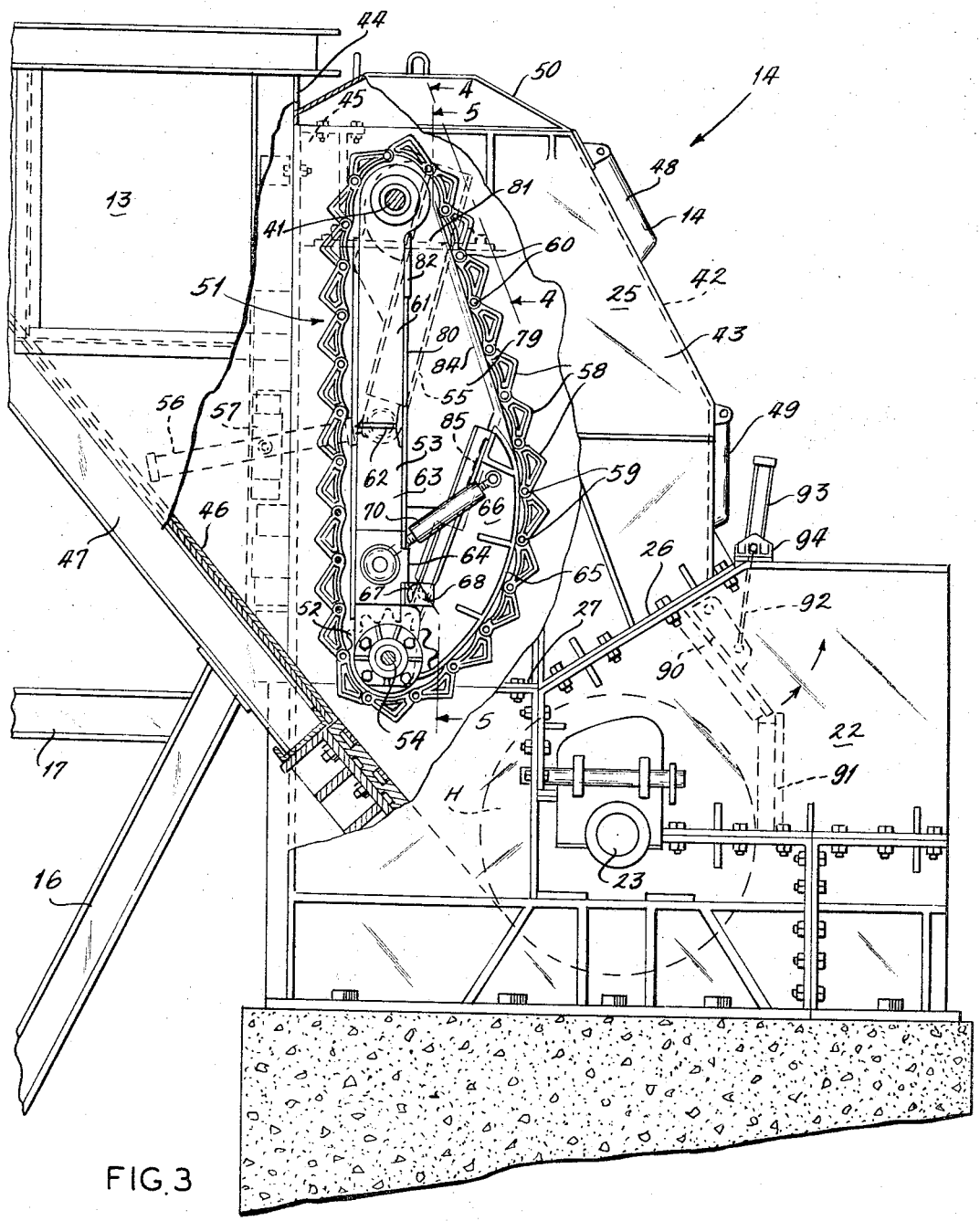
FIG. 3 is a greatly enlarged fragmentary side view of the apparatus shown in FIG. 1, portions being broken away to show internal structure.
Figure 5:
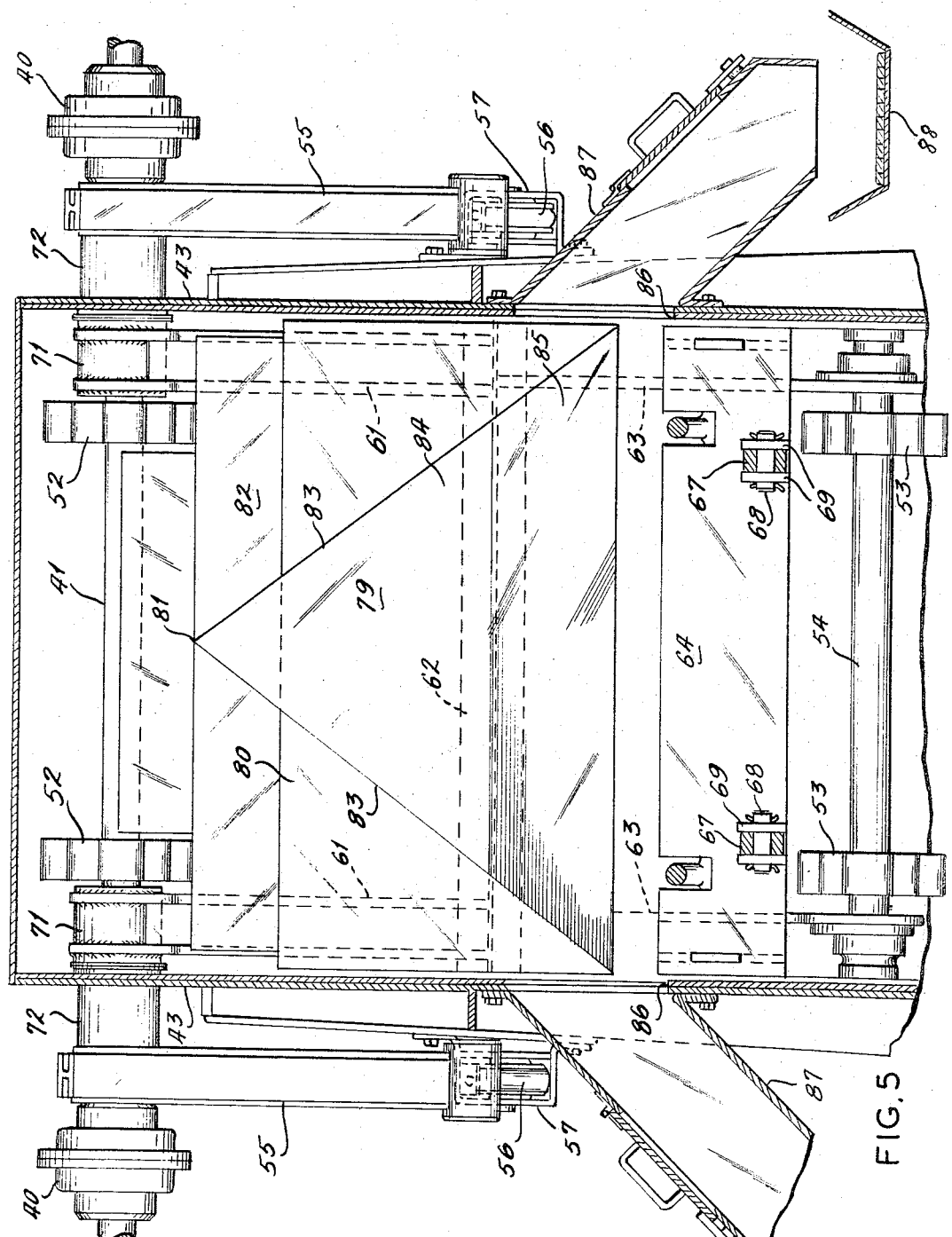
FIG. 5 is an enlarged sectional view taken at line 5—5 in FIG. 3.

As is shown in FIGS. 1, 3 and 5, the mill 4 is provided with a feed control curtain 51 disposed between the hopper 13 and the hammer mill casing 22. The curtain 51 is supported from sprockets 52 at the upper end on shaft 41, and its lower end is guided by idler sprockets 53 mounted on shaft 54 in a frame pivotally hung from shaft 41. The angular movement of the entire curtain 51 about the axis of shaft 41 is effected by a pair of arms 55 located outside the side walls 43 of the housing 25. The arms hang down and the lower end of each is connected to a piston-cylinder motor means 56 pivotally supported in a bracket 57. The curtain 51 is made up of a series of crusher bars 58 linked together by pivot pins 59 in interfitted ears 60 so that the bars will pass around the sprockets 52 and 53 and be driven by the sprockets 52.

The curtain 51 has a frame composed of upper side arms 61 connected at the lower ends by a transverse member 62, lower arms 63, and a bracket 64. The idler sprocket shaft 54 is carried in arms 63. The curtain bars 58 are maintained in operating tension on the shafts 41 and 54 by a slack take-up shoe having ribs 66 supporting the face 65. The shoe is pivoted at 67 on pivot pins 68 carried in lugs 69 by the bracket 64. The shoe is held in adjusted position by a threaded extensible arm 70.

Figure 4:
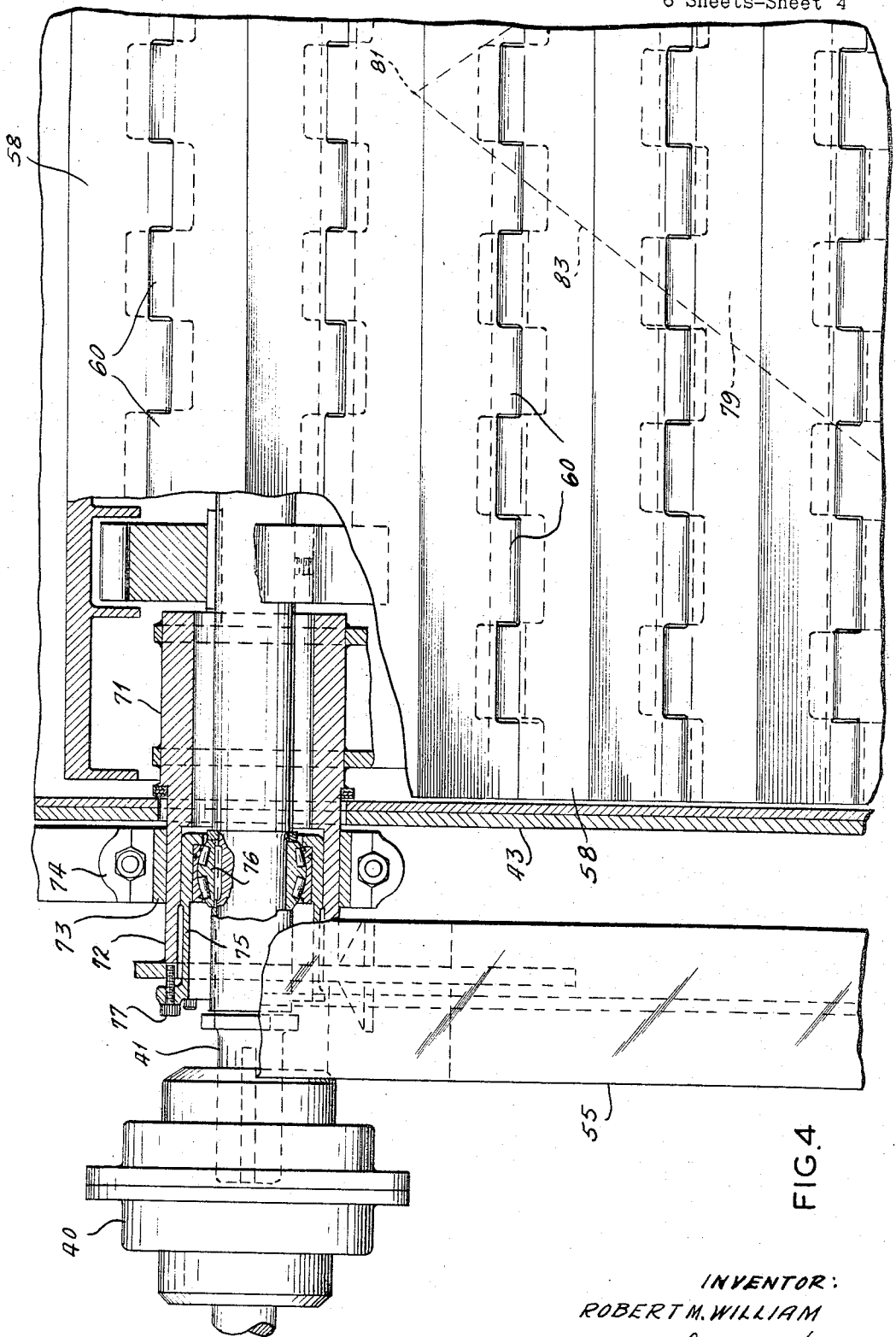
FIG. 4 is an enlarged fragmentary view taken at line 4—4 in FIG. 3.

Looking now at FIGS. 4 and 5, the shaft 41 is seen to extend completely through the apparatus from coupling 40 to coupling 40. In the vicinity of each side wall 43, a pivot hub 71 surrounds the shaft 41. The hubs 71 project outwardly of walls 43 where the exposed portion 72 is supported by a sleeve bearing 73 in a bearing mounting 74 attached to the frame or side wall 43. Inside the hub 72 is the support 75 for anti-friction bearing 76 which carries the shaft 41 therein. The assembly of the bearing includes bolts 77 between the hub 72 and support 75. The curtain control arms 55 connect to the hub portions 72 and do not interfere with the rotation of shaft 41 in bearing 76. While one side of the bearing assembly has been shown in FIG. 4, it is understood that the same assembly is at the other side.

Turning now to FIGS. 2, 3 and 5, it is seen that the crusher bars 58 of the curtain enclose a space between the front vertical pass of the bars and the curved rear pass of the same. Dirt and foreign materials, as well as metallic pieces, usually work into this space and get tossed about, but in this improved apparatus the space is occupied by a diversion slide carried by the backing plate 80. The apex end 81 of the slide 79 is connected to a cross plate 82, and opposite sloping side walls 83 diverge at an acute angle. The rear wall of the slide (in relation to the plate 80) has a first slope 84 and a second slope 85 that follow the upward return pass of the curtain bars 58 above the space for the shoe 65. As seen in FIG. 5, the side walls 83 extend toward the side walls 43 of housing 25, and each side wall 43 is formed with an opening 86 leading to a chute 87. Dirt and other matter finding its way into the space enclosed by the curtain 51 will be diverted by the sloping falls 83 into the openings 86 and chutes 87 where the same will be directed onto a take-off conveyor 88, one being shown at the right side.

In FIGS. 1 and 3 there is shown a metal trap throwout door 90 pivotally mounted in casing 22 above a breaker wall 91. The door 90 is connected to the rods 92 of a pair of piston-cylinder motors 93 located outside the casing 22 on a pivot block 94. The door 90 may be opened by an operator to allow oversized metal to be thrown from the crushing chamber 22. The objectionable particles pass into the adjacent space outside wall 91 and are allowed to drop through to a conveyor (not shown) at the back of the apparatus.

Turning now to FIGS. 6, 7 and 8 there is seen the control system for the apparatus which includes the hydraulic diagram of FIG. 6, the motor meter relay system of FIG. 7, and the motor monitoring system in FIG. 8. In order to simplify the disclosure no attempt has been made in the views of FIGS. 1 to 5 to show the hydraulic or electrical system as such disclosure will be amply set forth in FIGS. 6 to 8. Before detailing the components in the latter views, it is important to appreciate the operating cycle of the apparatus.

In normal operation, with mill motor M running the curtain 51 will be moved by piston-cylinder motor means in a clockwise or down direction (FIG. 3) to a closed position such that no auto body can pass under the lower end at shaft 54 unless the travelling curtain is moving. The curtain bars 58 will be driven from upper shaft 41 by rotating said shaft in a counterclockwise direction through motors 33. The auto body slides down the hopper wall 46 against the curtain and establishes contact with the bars 58 which, because of the direction of movement, begin to feed the auto body into the crusher chamber 22. The curtain 51 will maintain pressure on the body and prevent it from being grabbed by the crusher hammers and drawn in bodily. The power of motors 33 through shaft 41 will be applied through the bars 58 to the auto body and the resistance offered by the auto body will cause an increase in the current draw at the motors 33. As the current draw increases beyond a set limit, the control circuit will regulate the piston-cylinder motor means 56 to move the curtain 51 in a counterclockwise or up direction (FIG. 3) to open the passage. This action relieves the power required to rotate the curtain bars 58. Pressure fluid to motor means 56 will swing the curtain 51 up to offset the gravity weight of the curtain assembly, but the curtain will maintain control on the auto body. As the auto body passes beyond curtain 51, the motor means 56 will be reversed to close the entrance to chamber 22. The system, therefore, automatically compensates for the load on the curtain 51, yet maintains a predetermined contact on an auto body AB and feeds it at a controlled rate into crusher chamber 22.

It can be seen that the system allows control over the pressure at curtain 51 to feed an auto body AB. The apparatus is unique in that the pivoted arrangement of the curtain 51 and its drive from the top end allows the same to be controlled from the outside of the chamber 22 and housing 25. Since the curtain 51 rotates and pivots it does not have any side seals in the housing 25 to prevent metal and dirt working into the space within the curtain bars 58. Such metal and dirt is picked up in the depression of the bars 58 and is carried upwardly before falling free. Constant cleaning is important to reduce wear on the bars 58 and other moving parts, and to this end the slide 79 is provided to divert the unwanted materials toward the external discharge chutes 87 where it is removed by means 88 (FIG. 2).

In this apparatus, the drive for shaft 41 includes a reaction arm device 32 (FIG. 1). The reaction device effects operation of the drive shaft 41 for the curtain. The arm of said device is prevented from rotating by reaction spring means. Should uncrushables enter the crusher so as to jam the curtain, the spring means will break or yield, thereby releasing the drive and allowing the internal gears to orbit about shaft 41 and not drive it.

With the foregoing in view, attention will now be directed to FIGS. 6, 7 and 8. In FIG. 6, electric motor 97 drives a pair of pumps, pump 98 being high pressure and pump 99 being low pressure. Both pumps draw hydraulic fluid from a supply tank 100 through an inlet screen 101. The high pressure pump 98 delivers through check valve 102 into branch lines 103 and 104. Branch line 103 leads through a check valve 105 to a line 106 connected to a fluid accumulator 107. The line 106 contains a flow control valve 108 which meters flow out of the accumulator 107. Line 103 continues on to a cross flow valve 109 operated in response to solenoid C, as well as to a pressure line 110 containing a damper valve 111 to filter out momentary pressure fluctuations, and a diaphragm 112 operating the arm of a pressure switch RS1. The presence of switch RS1 will control the fill of the accumulator and will also cause response in either solenoids B or D as will appear. The cross flow valve 109 has a first conduit 114 connected to the piston cylinder motor means 93 on the trap door 90 to move the door in an opening direction, and a second conduit 115 also connected to the motor means 93 to move the door to closed position. The return flow from valve 109 is through line 116.

The high pressure fluid in branch line 104 (FIG. 6) is connected to a cross flow valve 117 responsive to solenoid D. The line 104 connects by line 118 to a pressure relief valve 119 which dumps fluid into return line 120. The line 104 has a branch 121 for a metering valve 122 associated with a line pressure reading gauge G. As shown line 104 supplies fluid to a valve 117 that is closed, but can be opened by solenoid D. Valve 117 connects to line 123 containing check valve 124 and on into line 125 which connects with a main conduit 126 leading to a solenoid controlled cross flow valve 127 which is normally set by a solenoid B to deliver the fluid into line 128 connected to the piston-cylinder motor means 56 to drive the curtain 51 down (closing direction). The cross flow valve 127 is also responsive to solenoid A, and when solenoid A is of fluid to a second line 129, while allowing the return fluid from line 128 to flow to the return line 130 protected by check valve 131. Line 129 connects to the motor means to move the curtain 51 up or in an opening direction.

Also, in FIG. 6, the low pressure pump 99 feeds supply conduit 132 connected through check valve 133 to the junction of line 125 and main conduit 126. The check valve 124 prevents low pressure back-up into line 123, and check valve 133 prevents high pressure back-up in line 132. The line 132 has a pressure relief valve 134 connected into line 135 leading to the return line 136, as line pressure gauge G1.

In FIG. 7, the circuits for the solenoids and relays are shown. The power for the circuits is supplied by a usual type transformer 140. One side of the transformer is connected to buss 141 and the other side is connected through a fuse 142 to buss 143. Pressure relief switch RS1 for the trap door control has a normally closed contact 144 and a normally open contact 145 to be selected by movable arm 146. The relay R2 (in a control unit to be described) has a normally closed contact 147 and a normally open contact 148. The relay arm 149 through lead 150 makes a circuit at contact 147 and lead 151 to switch RS1. Switch RS1 in its normal position does not energize solenoid D on the cross flow valve 117. When the arm 146 moves to contact 145 circuit to solenoid D is made through leads 152 and 153 to buss 141. Relay R2 has its arm 149 normally at contact 147 to energize lead 154 to solenoid B and lead 155 to buss 141. When arm 149 of relay R2 moves to contact 148 leads 156 and 157 to buss 141 energize solenoid A. The relay R3 connected by lead 158 makes a circuit by its arm 159 at normally closed contact 160 to lead 161, motor 33, and lead 162 containing capacitors 163 and 164. The relay R3 has a normally open contact 165.

It is observed that relays R2 and R3 are shown again in FIG. 8 wherein the motor monitoring control is shown. In this latter view there is the main power supply of three phase character depicted by leads L1, L2 and L3 connected to one of the main drive motors 33 for the curtain shaft 41. One lead L1 has a current transformer 166 thereon to monitor the current being drawn by the motor 33. The transformer 166 is connected by leads 167 and 168 to a curtain motor monitor CM. The monitor CM is an instrument that provides automatic control for any desired preset load on an electric motor, and the particular instrument here has a visual reading dial 169 with a preset pointed 170 to select the desired load setting and a movable pointer 171 to indicate the actual current flow. When the current flow in transformer 166 reaches the present value as determined at pointer 170, the relay R2 is activated to close normally open contact 148 and energize solenoid A (FIG. 6) to switch the motor means 56 for moving the curtain 51 up to reduce the load on motor 33. When relay R2 moves to contact 148 it deenergizes both solenoids B and D so that the high pressure in line 104 will not be effective, while the low pressure in line 132 will be supplied to motor means 56 for moving curtain 51 up.

A second monitor control MM is provided to sense the load drawn by at the main mill motor M. While the first monitor CM sensed the resistance to curtain operation and corrected the up-down or angular position, this monitor MM senses the motor loads needed to rotate the mill rotor on shaft 23. Thus, the transformer 172 in lead L1 to motor M is connected to monitor MM by leads 173 and 174, and this energizes relay R3 as before described. Monitor MM has dial 175 with a set pointer 176 and a movable pointer 177 to indicate the actual value of the current flow. When the pointers 177 and 176 coincide the relay R3 is activated to open the circuit to motor 33 and stop the drive at curtain shaft 41 because the mill rotor is overloaded and must be allowed time to digest the material in the crusher casing 22 before more is fed in. When the motor load has cleared the unit MM will reset relay R3 to start the motor 33 for driving the curtain.

It should now be apparent that monitor MM, through current transformer 172 placed around one leg of the electrical line L1 to the main mill motor M, monitors the current drawn by the mill as it grinds an auto body AB. The current relay R3 has a set point, variable by pointer 176 from 0 to 150% of load. When the load on motor M reaches the set point it activates relay R3 from a normally closed to an open position. This action opens the starting circuit SC (FIGS. 7 and 8) for motor 33 for the curtain 51. When the overload is relieved the relay R3 closes contact 160 and the starter circuit SC is reclosed to start up motors 33. The foregoing monitor MM prevents the mill motor M from being overloaded by stopping the drive motors 33 for curtain 51 and may be used to stop conveyor 10 if desired. When motors 33 stop no current flows at transformer 166 and curtain monitor CM has relay R2 move to normally closed position at contact 147 which activates solenoid B to adjust cross flow valve 127 for pressure fluid flow to the curtain down side of motor means 56. This latter action causes the curtain to move down and assures that no further feed to the mill will occur until the cause of the overload has been cleared.

The monitor CM is used to regulate the current load drawn by the curtain motors 33, and this is used to control the up and down positioning of the curtain by the hydraulic motor means 56. In a normally closed condition when the curtain motors 33 are not drawing too much current, solenoid B is energized to hold the curtain down. As the load becomes excessive on motors 33, relay R2 switches to its normally open contact 148 and activates solenoid A, while deactivating solenoids B and D simultaneously. Solenoid B switches valve 127 to cause a down action of motor means 56 on the curtain, and solenoid A switches valve 127 to cause an up action of motor means 56 on the curtain. Thus when solenoid A is activated it will release the curtain pressure on the auto body AB and this will drop the current demand at motors 33. As the current load at motors 33 drops, the monitor CM will register this and again set relay R2 at its normally closed contact to move curtain 51 down, thereby preventing the auto body slipping passed the curtain. It also keeps the curtain in constant contact with the auto body as the shape thereof changes, and feeds the same at a predetermined rate within the capacity of the mill motor M.

It is not necessary to use the curtain 51 to crush the auto body, and for this reason there is provided an hydraulic system for controlling the force of the curtain and its holding action. In FIG. 6 there has been shown high pressure-high volume and low pressure-low volume pumps, the reason being that the low volume-low pressure pump can regulate the up movement of the curtain 51 at a nice slow, gradual rate, whereas the high volume-high pressure pump will develop lots of power to rapidly move curtain 51 down for substantially instantaneous action. The system also uses solenoid D at valve 117 to close high volume fluid flow to line 123 until the accumulator 107 is filled to a predetermined high pressure set by switch RS1. Once the accumulator 107 has been satisfied by pump 98, it can be discharged when there is a power failure, or the monitor controls CM and MM will take over and regulate solenoids A and B. It is noted that motor means 93 are pushing on the trap door 90 to open or close it, depending on the setting of the solenoid C for cross flow valve 109. When 107 is filled, relay switch RS1 will activate solenoid D to move valve 117 so that the pump pressure in line 104 will be applied directly through valve 127 but at a lower setting determined by pressure relief valve 119.

The low pressure pump 99 supplies fluid from the same source 100 to the line 132, and through check valve 133 to main line 126 supplying the curtain motor means 56. Should the curtain suddenly drop off the end of an auto body or for some reason return from a greater than normal up or open position, the pressure in line 126 will drop and both pumps 98 and 99 will then deliver full output to the motor means 56 to bring the curtain down as soon as possible. Once it engages another auto body the pressure will build up again and the small pump 99 will be cut out by pressure relief valve 134, so that the system operates as intended.

In FIG. 6, the metal trap door 90 is held down by motor means 93 as solenoid C is activated from a suitable remote switch. Should an overload occur or uncrushable objects be introduced to the mill, or complete power failure occur, the solenoid C can be deactivated quickly by its return spring and the motor means 93 actuated to open the door 90 rapidly. The motor means 93 drops the pressure in the line 114, but the volume of fluid stored under pressure in accumulator 107 will through the flow control 108 supply make up fluid to lines 106 and 114, and also supply fluid through line 126 to bring the curtain 51 down. Pressure switch RS1 will be activated to close solenoid D and cause the output of pump 98 to supply line 126. Since the curtain 51 is heavy its fall by gravity will cause the pistons in motor means 56 to tend to draw a vacuum (reduce pressure) which lowers pressure in line 126 so that both pumps 98 and 99 supply fluid to line 126.

The foregoing has disclosed a preferred apparatus for scrap metal reduction, and particularly the character of improved apparatus for crushing and reducing discarded auto bodies that constitutes a valuable source of metal capable of being reduced and refined for reuse in steel making. There are modifications that can be made by those skilled in the art without departing from the principal theories of operation or avoiding certain equivalents of structure, and it is the intent to cover the same within the scope of the appended claims.

What is claimed is:

1. Apparatus for grinding up auto bodies and reducing the same to particles including a grinding mill casing having a top opening, an auto body feed chute connected to said mill top opening, a housing carried on said casing adjacent said feed chute, said housing being open to said feed chute, a shaft mounted in said housing and spaced above said casing top opening, independently movable tubular shaft means carried by said shaft and extending into said housing, a frame swingably mounted on said shaft by and from said tubular shaft means within said housing and extending downwardly toward said top opening, a curtain of crusher bars mounted on said frame to move about the lower end thereof adjacent said housing opening at said feed chute, means connected on said shaft and drivingly connected to said curtain to move the same relative to said frame, motor means driving said shaft to, in turn, drive said curtain about the lower end of said frame, and power operated means connected to said independently movable tubular shaft means to swing the frame relative to said housing opening into said feed chute for intercepting auto bodies in said feed chute.

2. The apparatus set forth in claim 1, wherein bearing means is carried by said tubular shaft means in position to support said shaft for rotation, and means is connected between said bearing means and tubular shaft means to retain said bearing means in operating position.

3. Apparatus for reducing whole metal bodies to usable scrap particles including a hammer mill having a feed opening, means to supply whole metal bodies to said feed opening, a curtain device in the apparatus, a shaft to operably support said curtain device in hanging position adjacent said feed opening to intercept whole metal bodies, said curtain device having a plurality of bars pivotally interconnected to form a descending pass for said curtain device on the side facing the supply of whole metal bodies and an ascending pass spaced therefrom, a motor driving said shaft to move said curtain bars in said descending pass against the whole metal bodies, power operated mechanism connected to said curtain device independently of said motor, said mechanism swinging said curtain device in opposite directions about said shaft axis as a center to press said curtain bars down on whole metal bodies and to relieve the pressure of said curtain bars, and also including a control system connected between said motor driving said shaft and said curtain swinging mechanism, said control system electrically responding to the increase and decrease of load on said motor to selectively operate said mechanism for swinging said curtain device in directions inversely related to the load on said motor.

4. Apparatus for reducing whole metal bodies to usable scrap particles including a hammer mill having a feed opening, means to supply whole metal bodies to said feed opening, a curtain device in the apparatus, a shaft to operably support said curtain device in hanging position adjacent said feed opening to intercept whole metal bodies, said curtain device having a plurality of bars pivotally interconnected to form a descending pass for said curtain device on the side facing the supply of whole metal bodies and an ascending pass spaced therefrom, an electric motor driving said shaft to move said curtain bars in said descending pass against the whole metal bodies, and power operated mechanism connected to said curtain device independently of said motor, said mechanism swinging said curtain device in opposite directions about said shaft axis as a center to press said curtain bars down on whole metal bodies and to relieve the pressure of said curtain bars, and said power operated mechanism swinging said curtain device is fluid pressure powered and includes a pressure fluid cross flow valve and solenoid means connected to said valve to shift said valve for swinging said curtain device in its opposite directions, and said apparatus further includes electrical control means connected between said electric motor and said solenoid means, said control means being responsive to current flow to said electric motor and activating said solenoid means to position said valve selectively for swinging said curtain device in direction inversely related to the amount of current flow to said electric motor.

5. Apparatus for reducing metal bearing bodies to reusable scrap particles including a hammer mill, hopper means to feed bodies gravitationally to said mill, a feed controlling curtain device adjacent said hopper means, a drive shaft spaced above said mill, one end of said curtain device being drivingly mounted on said shaft and the opposite end being adjacent said mill to intercept bodies being fed thereto, trunnion means concentric with said drive shaft and being connected to said curtain device to provide a pivot for swinging the opposite end of said curtain device toward and away from said hopper means, reversible motor means connected to said trunnion means to effect the swinging movement of said curtain device, an electric motor connected to said drive shaft to rotate said curtain device about said shaft, electrically responsive control means connected to said reversible motor means to select the direction of swinging movement of said curtain device, and electric current monitoring means connected between said electric motor and said electrically responsive control means to coordinate the current use of said electric motor in rotating said curtain device and the setting of said control means to actuate said reversible motor means.

6. Apparatus for reducing whole auto bodies to reusable scrap particles including a metal reduction hammer mill, a frame mounted on said mill and having a sloping wall to gravitationally feed whole bodies into said reduction mill, a feed controlling curtain device having a lower end adjacent said sloping wall and an upper end spaced thereabove, a drive shaft in said frame connected to said upper end of said curtain device, a frame operably supporting said curtain device at its lower end and swingably suspended from said drive shaft, an electric motor driving said shaft in a direction to move said curtain device about said frame and engage the whole bodies, a source of electric current connected to said electric motor, arm means connected to said frame to swing said frame selectively down toward the whole bodies so that said curtain device presses on and intercepts the gravity feed thereof and upwardly away from the whole bodies to reduce the pressure of said curtain device and advance the feed thereof, reversible fluid pressure operated motor means connected to said arm means to control the selective positions of said frame and curtain device, a source of pressure fluid connected to said reversible motor means, solenoid operated cross flow valve means in said pressure fluid connection to regulate the position of said frame, an electric current monitoring device having a transformer in the electric current source to said electric motor responsive to current flow to said electric motor, and relay means connected between said monitoring device and said solenoid operated cross flow valve means, said relay means responding to current flow to said electric motor to actuate said solenoid operated cross flow valve means for effecting regulation thereof in accordance with current flow to said electric motor and to selectively swing said frame down and up to avoid electric motor overloading.

7. In apparatus for reducing auto bodies to usable particles, a hammer mill, a main electric motor driving said mill, means to feed whole auto bodies into said mill, body feed control means comprising a travelling curtain disposed in a substantially vertical position, a drive shaft connected to said curtain at its upper end, a frame pivoted from said drive shaft and supporting the lower end of said curtain, reversible drive means connected to said frame to pivot the frame in opposite directions and cause said travelling curtain to press upon and relieve its pressure upon bodies in said feed means, a secondary electric motor connected to said drive shaft, and a control system for the apparatus connected to said main and secondary motors and said reversible drive, said system including current flow monitors connected to said main and secondary electric motors, a first relay in one of said monitors responsive to current flow to said main motor and connected to said secondary motor to stop the latter motor upon overload in said main motor, and other relays responsive to another monitor responsive to current flow to said secondary motor and connected to said reversible drive to pivot said curtain selectively to release or press upon bodies in said feed means inversely with the drive load on said curtain by said secondary motor.

8. Apparatus for reducing auto bodies and the like to smaller concentrated metal chunks including a reducing mill, first drive means to drive said mill, means to feed bodies into said mill, a travelling and swingable curtain controlling the movement of bodies in said feed means, second drive means to cause said curtain to travel, third drive means to cause said curtain to swing and press more or less upon bodies in said feed means, and control means connected between said second and third drive means to govern said third drive means and swing said curtain more or less in inverse relation to the effort of said second drive means to cause curtain travel.

9. The apparatus set forth in claim 8, and further including other control means connected between said first and second drive means to stop said second drive means upon predetermined overload on said first drive means.

10. The apparatus set forth in claim 9, and further including a throw out door for said mill through which uncrushables are discarded, fourth motor means normally pushing said door closed, and further control means connected between said fourth motor means and said control means between said second and third drive means, said further control means governing said third drive means to swing said curtain to press more on the bodies concurrently with actuating said fourth mtor means to reverse its normal push and open said door.

11. The apparatus set forth in claim 8, wherein said control means connected between said second and third drive means includes a fluid pressure system having an accumulator under pressure therein, and further includes other control means between said first and second drive means to stop said second drive means upon predetermined overload on said first drive means.

References Cited
UNITED STATES PATENTS

| | | | |
|---|---|---|---|
| 1,723,726 | 8/1929 | Doyle | 241—34 |
| 2,001,543 | 5/1935 | Payne | 241—34 |
| 2,150,984 | 3/1939 | Near et al. | 241—186 |
| 2,235,856 | 3/1941 | Waechter | 198—207 X |
| 2,764,361 | 9/1956 | Moore | 241—186 |

ANDREW R. JUHASZ, *Primary Examiner.*